United States Patent Office 2,847,657
Patented Aug. 12, 1958

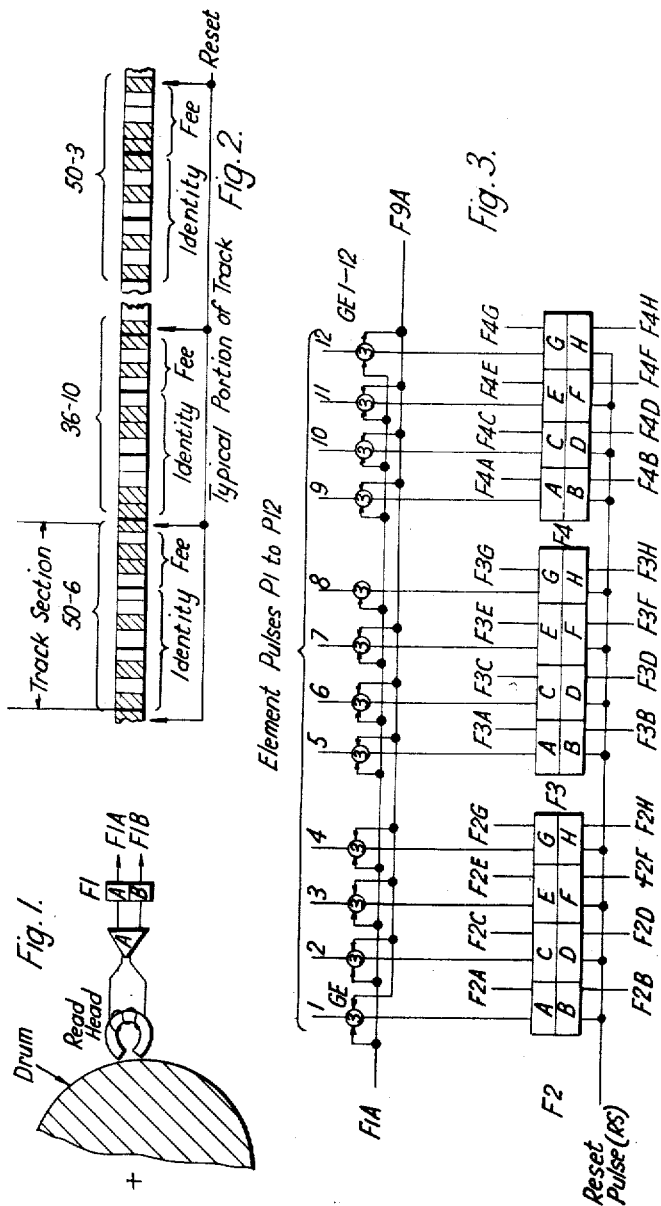

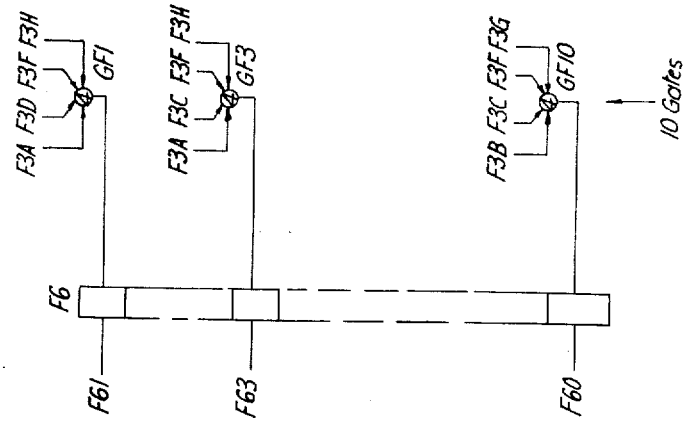
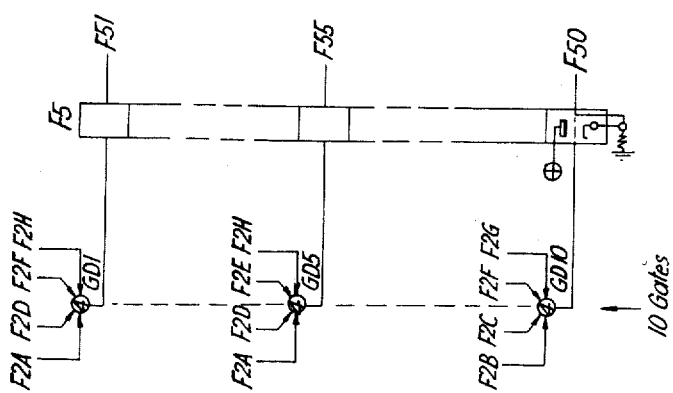
Fig. 4.

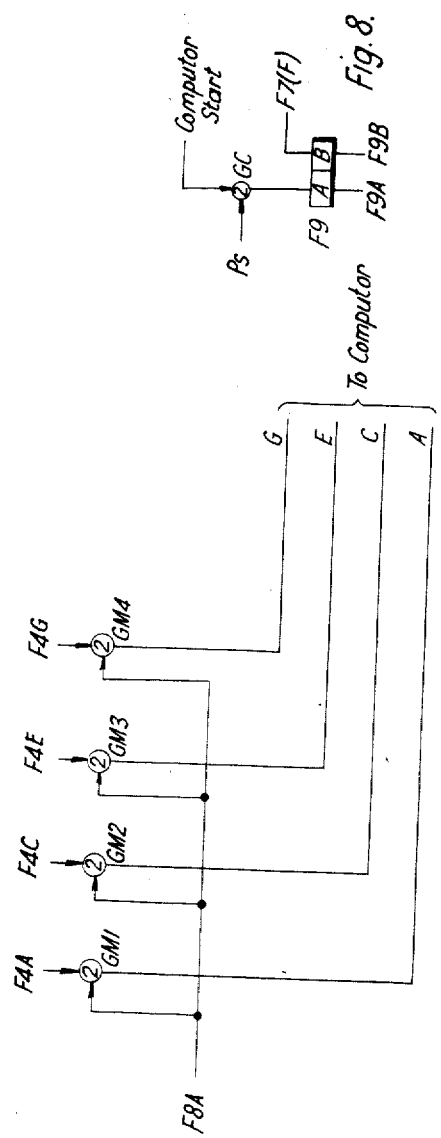

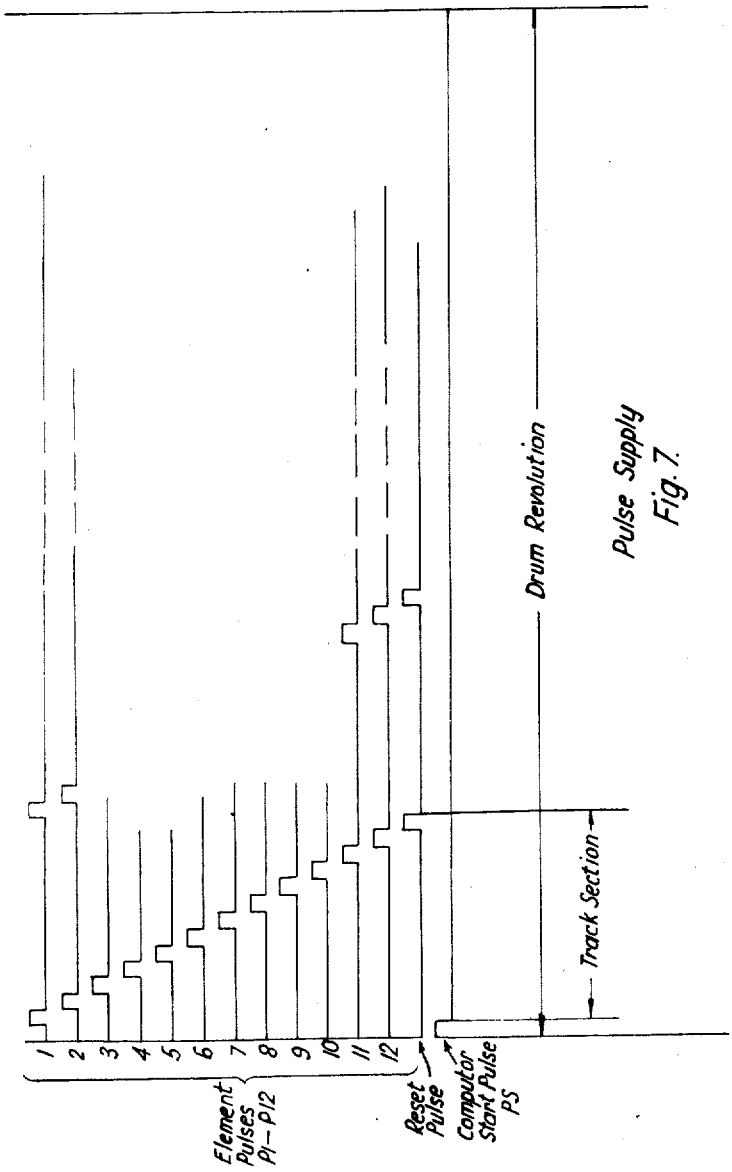

2,847,657

STORAGE OF ELECTRICAL INTELLIGENCE

George Clifford Hartley and Frederick Harry Bray, London, England, assignors to International Standard Electric Corporation, New York, N. Y.

Application May 19, 1954, Serial No. 430,943

Claims priority, application Great Britain April 26, 1954

6 Claims. (Cl. 340—174)

This invention relates to storage equipment for electrical intelligence and has for its object enlarging the field of use of such equipment.

The main feature of the invention comprises storage equipment for electrical intelligence comprising a number of stores each capable of storing a related set of intelligence signals, recording means associated with said stores and adapted to store intelligence seriatim in said storage medum, reading means associated with said stores and adapted to scan intelligence stored in said stores seriatim, a comparator for comparing an identification signal or plurality of signals read from a store with a control signal or signals to determine whether there is a predetermined relation between them, and means for performing a further operation in respect of a store wherein said comparator finds the said predetermined relation.

The invention will be clearly understood from the following description of one embodiment thereof shown in the accompanying drawings in which:

Fig. 1 shows diagrammatically a magnetic drum with its reading equipment.

Fig. 2 shows how the sections of a peripheral track on the drum of Fig. 1 are utilised for recording discrete items of intelligence.

Figs. 3 to 6 and 8 show by means of functional symbols the sorting equipment for sorting out arithmetic information items identified by the same identification number from a magnetic drum track and for summarising and recording groups of items each having the same identification number.

Fig. 7 shows the basic electrical pulse supply used in the equipment.

Figure 5:
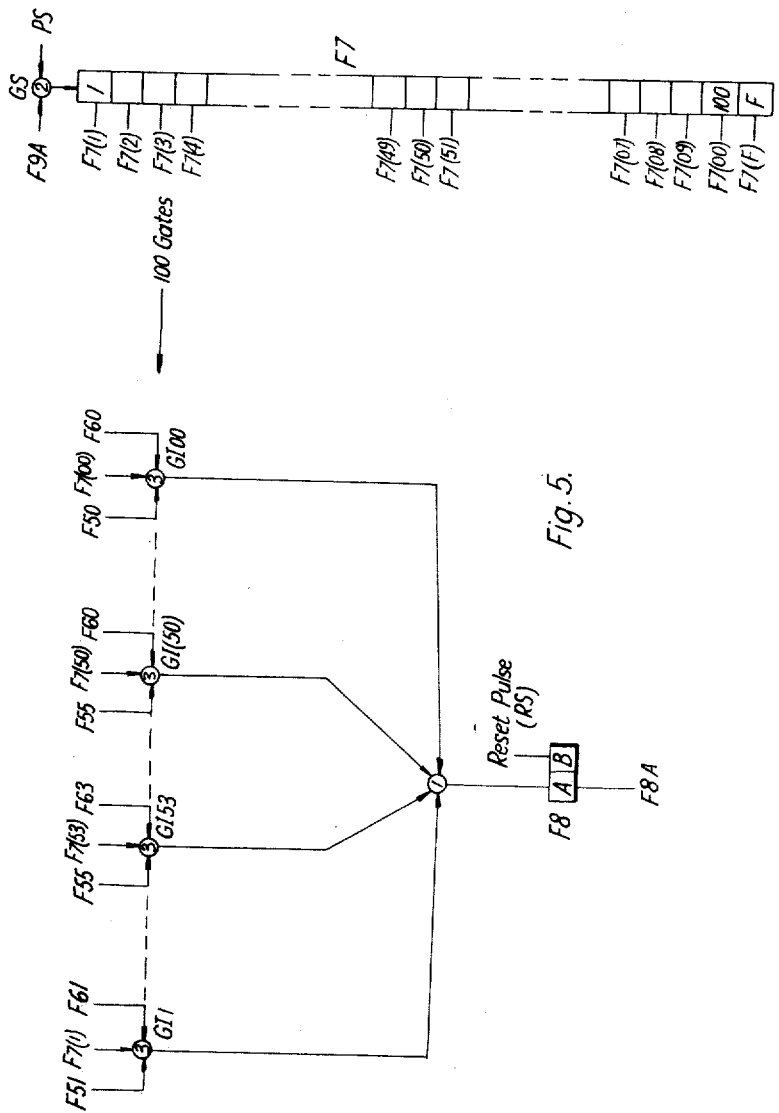

These drawings utilise functional symbols to indicate electronic circuit tools, the detailed design of which is well known.

Before proceeding with the detailed description of the circuits, an explanation of the circuit conventions will be given.

Electronic gates, well-known per se, are shown as circles with incoming controls shown as radial leads with arrow-heads touching the circle. Outputs are shown as radial leads with arrow-heads pointing radially outwards. The number inside the circle indicates the total number of controls which must be energised for the gate to deliver an output; for instance, if there are four controls, and the number in the circle is 2, then the gate will deliver an output when any two of its controls are energised.

The remaining conventions to be described are those for flip-flops and decimal counters.

A decimal counter comprising a number of single-component stages each of which is capable of assuming one of two conditions, on or off, is shown as a series of rectangles drawn in linear array. The counters shown all count to the end of their cycle and then reset during ordinary operation. A multi-stable register, is shown in a similar manner to a counter, but depending on circumstances, any stage can operate in any order.

A flip-flop of the bistable type is essentially a two stage multi-stable register.

If the flip-flop and other circuit outputs were connected to all the gates which they control there would be a complex network of leads which would be difficult to follow. These leads have therefore been omitted and the short control leads to the gates have been given references determined by the flip-flop or other circuit concerned and by the unit of the flip-flop energising the lead. Thus, flip-flop F1 can energise lead F1A the final A indicating which unit of the flip-flop is energising the lead.

Cases arise where information particular to certain identities is stored on a magnetic drum and where said identities may occur at various positions on the periphery of the drum and at any number of positions. Such a case is that where information regarding call particulars, such as the chargeable fee, is stored, together with the identity of the calling subscribers, and it is required at intervals to extract such fee information for these subscribers in order that a total of fee charges can be recorded, as described in the application of G. C. Hartley, Serial No. 430,942, filed May 19, 1954. In more detail a track on a magnetic drum can be divided into sections, each section consisting of a number of elements, each element being capable of being magnetised depending on the information to be stored.

Fig. 1 shows for explanatory purposes a reading head associated with a magnetic drum and connected via an amplifier to a conventional flip-flop F1, such that when a magnetised element is encountered, the derived signal F1A is produced, while signal F1B is produced when the element is not magnetised.

Fig. 2 shows a portion of a track where again for descriptive purposes track sections are shown which stores the identify of the subscriber and the chargeable fee. Four elements have been shown for fee storage but the number of elements can of course be increased to include other additional information, as, for instance, time of origination of call, elapsed time, or the fee category. Fig. 2 shows in one section the fee chargeable to subscriber 36 and in two sections the fee chargeable to subscriber 50 for two originated calls. Where additional elements are provided for information additional to the fee, then this information is extracted in the same way as will be described later for extracting the fee.

Fig. 7 shows the basic pulse supply used. There is one pulse train provided for each element per section, in this case represented by pulses P1 to P12, and a reset pulse train occurring during the last element in each section. A start pulse PS occurs once per revolution of the drum.

Let it be assumed that information has been stored on the drum track, as indicated in Fig. 2, and it is desired to extract this information. A computor start signal, which may be from a start key (not shown), is applied to gate GC, Fig. 8, and when the next PS pulse arrives GC is operative and F9 flip-flop operates to the A side.

F7, shown in Fig. 5, is a counting train consisting of 100 tubes connected in a known manner such that one tube on firing extinguishes the preceding tube, successive pulses delivered to the input thus operating the tubes in sequence. GS is operative when F9A and PS are present and tube 1 in F7 conducts and delivers an output on F7(1). A signal on F7(1) indicates that information is required relative to subscriber No. 1 during one drum revolution. The next appearance of PS at the beginning of a revolution steps the counter F7 and fires the second tube and information is extracted for subscriber No. 2 as will be described later. Thus, in each revolution of the drum information will be extracted for subscribers, as indicated by the tube operated in F7.

Consider now subscriber 50. F7 has tube No. 50 conducting and an output is present on F7(50), and a track section, as shown in Fig. 2, is about to pass under the read head. Elements shown shaded in Fig. 2 are assumed to be magnetised. F9A applies a stimulus to all gates GE1 to 12 and F1A is operative when a magnetised element passes under the head. For the case considered therefore, gates GE1, 3, 6, 8, 10 and 11 will be operative in turn to the application of element pulses and a signal will pass through these gates to the stores F2, F3 and F4. These stores consist of 4 flip-flops A and B, C and D and so on, and the reset pulse which occurs at the end of each track section will set these flip-flops to the B, D, F and H positions.

Signals through the gates GE1, 3, 6, 8, 10 and 11 previously mentioned will therefore cause store F2 to be in the condition of A, D, E and H operated, F3 with B, C, F and G operated and F4 with B, C, E and H operated. Information on the track section for subscriber 50 has therefore been transferred to these stores. Ten gates GD1 to 10 (Fig. 4) are connected to the outputs from F2 store and ten gates GF1 to 10 to the outputs of F3 store, each gate being operated by a different combination of these outputs and it can be seen that GD5 and GF10 are operative. F5 and F6 (Fig. 4) each consist of 10 individual electron tubes, so that one tube connected to the output of GD5 and one tube connected to the output of GF10 will conduct and will deliver an output at F55 and F60 respectively. The identity of the subscriber has now been transferred from stores F2 and F3 and the conducting tubes in F5 and F6 indicate the subscribers number in decimal notation (50).

Fig. 5 shows 100 gates GI1 to GI00 connected to the outputs from tubes in F5 and F6, but gate GI50 will only be operative since F7 is delivering a signal on F7(50), in addition to the signals from F55 and F60. F8A will therefore become operated and connect a control to gates GM1 to 4 shown in Fig. 6. It can therefore be seen that F8A is only operative when the identity of a subscriber as extracted from the drum agrees with the tube operated in F7.

Information relative to subscriber 50 is now supplied to a computor as shown in Fig. 6. In store F4 (Fig. 3) B, C, E and H were operated and therefore gates GM2 and GM3 will gate signals over leads C and E to the computor where such signals can operate stores in a conventional manner. At the end of the track section for subscriber 50 the reset pulse will set the stores F2, F3 and F4 to the B, D, F and H positions, will set F9 to B and F8 to B. When the next track section passes under the head information will again be transferred from the drum as described, but if the identity does not agree with the position of F7 then no gate GI (Fig. 5) will become operative, F8 will remain at its B position, and hence no GM gate in Fig. 6 will close and so no information is fed to the computor. When however a track section for subscriber 50 appears, then, as previously described, F8 becomes operative and new additional information is supplied to the computor. The computor in well known fashion can add this additional fee information to that received previously such that a total can be computed for subscriber 50.

At the end of a revolution the PS pulse will step the counter F7, an output will appear on F7(51) and all information relative to subscriber 51 can be extracted. The counter steps then for every revolution. During each revolution information is extracted for the subscriber indicated by the tube operated in F7, and after 100 revolutions of the drum all 100 subscribers are dealt with. At the end of these 100 revolutions F7(F) will conduct, F9B will become operative with F9A not operative, and no further information can be gated via gates GE1 to GE12. This condition could, if so desired connect a polarity to an erase head (not shown), so as to erase all information stored on the track.

While the principles of the invention have been described above in connection with specific embodiments, and particular modifications thereof, it is to be clearly understood that this description is made only by way of example and not as a limitation on the scope of the invention.

What we claim is:

1. Storage equipment for electrical intelligence comprising a number of stores each capable of storing a related set of intelligence signals including an identification signal, reading means associated with said stores and adapted to scan intelligence stored in said stores seriatim, means for temporarily storing the intelligence signals read by said reading means, means independent of said stores for producing a series of control signals, a comparator connected to said temporary storing means, and to said means for producing control signals for comparing an identification signal stored in said temporary storing means with one of said control signals to determine whether there is a predetermined relation between them, and means responsive to the operation of said comparator for performing a further operation in respect of a store when said comparator finds the said predetermined relation.

2. Storage equipment for electrical intelligence, as claimed in claim 1, in which the reading means comprises scanning equipment for reading all stores seriatim in a cycle which is continuously repeated, and the means for producing a series of control signals comprises sequence control equipment for changing the control signal applied to said comparator between successive cycles, whereby in each cycle further operations may be performed in respect of each store in which said predetermined relation to the respective control signal is detected during that cycle.

3. Storage equipment, as claimed in claim 1 in which the means for producing the control signal includes means for automatically changing the control signal at the end of successive cycles of operation of the reading means.

4. Storage equipment for electrical intelligence comprising a number of stores each capable of storing a related set of intelligence signals including an identification signal, reading means associated with said stores and adapted to scan intelligence signals stored in said stores seriatim, means for temporarily storing the intelligence signals read by said reading means, means independent of said stores for producing a series of control signals, a comparator connected to said temporary storing means and to said means for producing control signals for comparing an identification signal stored in said temporary storing means with one of said control signals to determine whether there is a predetermined relation between them and signal transmitting means for transmitting a further signal from said temporary storing means when said comparator finds the said predetermined relation.

5. Storage equipment for electrical intelligence comprising a plurality of stores each capable of storing a related set of intelligence signals, reading means adapted to scan said intelligence signals in succession, a plurality of additional stores, there being a first one for storing certain of a set of intelligence signals to be used for identification purposes and a second one for storing certain other intelligence signals of a set representing information, means connected between said reading means and said additional stores for transferring a predetermined number of signals produced by said reading means when scanning a single store to said first additional store, means for transferring another predetermined number of signals from said reading means to said second additional store, a comparator, means for feeding the signals stored in said first additional store to said comparator, means independent of said stores and said additional stores for producing a succession of control signals, each corresponding in length to the time required for said reading means to scan all of said first mentioned stores, means for feeding said control signals in succession to said comparator, said comparator being responsive only when a predetermined relation exists between a signal from said first additional store and a control signal, an output circuit and means controlled by said comparator for feeding the signals stored in said second additional store to said output circuit.

6. Storage equipment, as claimed in claim 5 in which said stores for said related sets of intelligence consist of successive sections of at least one endless magnetic track.

References Cited in the file of this patent

UNITED STATES PATENTS

| | | |
|---|---|---|
| 2,549,071 | Dusek | Apr. 17, 1951 |
| 2,617,704 | Mallina | Nov. 11, 1952 |
| 2,674,733 | Robbins | Apr. 6, 1954 |
| 2,679,638 | Bensky | May 25, 1954 |
| 2,721,990 | McNaney | Oct. 25, 1955 |

OTHER REFERENCES

"24 Digit Parallel Computer With Magnetic Drum Memory," 1949, by ERA Inc., vol. 1, pages 27 to 30; vol. II, Figs. 3.2–2; 3.3–4; 3.3–5; 3.3–8; 3.3–10; 3.3–11. Copy in Div. 23.